United States Patent
Nishikawa

(10) Patent No.: US 8,938,024 B1
(45) Date of Patent: Jan. 20, 2015

(54) PREAMBLE GENERATING DEVICE, PREAMBLE GENERATING METHOD, AND NON-TRANSITORY COMPUTER-READABLE RECORDING MEDIUM STORING A PROGRAM

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 14/287,376

(22) Filed: May 27, 2014

(30) Foreign Application Priority Data

Jul. 9, 2013 (JP) .................................. 2013-143311

(51) Int. Cl.
*H04L 27/00* (2006.01)
*H04L 27/36* (2006.01)
*H04L 27/26* (2006.01)

(52) U.S. Cl.
CPC .................................. *H04L 27/2615* (2013.01)
USPC .......................................... 375/295; 375/297

(58) Field of Classification Search
USPC .................... 375/260, 295, 297; 370/203, 210
See application file for complete search history.

(56) References Cited

U.S. PATENT DOCUMENTS

| | | | | |
|---|---|---|---|---|
| 8,761,299 | B2 * | 6/2014 | Nishikawa | 375/295 |
| 8,804,478 | B2 * | 8/2014 | Han et al. | 370/210 |
| 2004/0136464 | A1 * | 7/2004 | Suh et al. | 375/260 |
| 2009/0219802 | A1 * | 9/2009 | Han et al. | 370/210 |
| 2010/0080310 | A1 * | 4/2010 | Moffatt et al. | 375/260 |
| 2010/0080312 | A1 * | 4/2010 | Moffatt et al. | 375/260 |
| 2010/0329186 | A1 * | 12/2010 | Lim et al. | 370/328 |
| 2011/0013575 | A1 * | 1/2011 | Liao et al. | 370/329 |

FOREIGN PATENT DOCUMENTS

JP 2008-508803 3/2008

* cited by examiner

*Primary Examiner* — Tesfaldet Bocure
(74) *Attorney, Agent, or Firm* — Warner Norcross & Judd LLP

(57) ABSTRACT

A first calculator generates first computational data by multiplying each element in a result obtained by applying a fast Fourier transform to data containing at least one of a real data sequence and an imaginary data sequence with reordered elements by an element of a preamble model at a same position as the each element. A second calculator generates second computational data by performing computation that converts an absolute value of each element in the inverse fast Fourier-transformed first computational data into a value in a predetermined range. A third calculator generates third computational data by multiplying each element in the fast Fourier-transformed second computational data by an element of the preamble model at a same position as the each element. A decider generates the third computational data as a preamble in a case of the PAPR of the inverse fast Fourier-transformed third computational data matching a predetermined criterion.

17 Claims, 10 Drawing Sheets

PREAMBLE GENERATING DEVICE, PREAMBLE GENERATING METHOD, AND NON-TRANSITORY COMPUTER-READABLE RECORDING MEDIUM STORING A PROGRAM

CROSS-REFERENCE TO RELATED APPLICATION

This application claims the benefit of Japanese Patent Application No. 2013-143311, filed on Jul. 9, 2013, the entire disclosure of which is incorporated by reference herein.

FIELD

This application relates to a preamble generating device, a preamble generating method, and a non-transitory computer-readable recording medium storing a program.

BACKGROUND

In communication using the orthogonal frequency-division multiplexing (OFDM) scheme, for example, a preamble used to detect and synchronize signals is added to the beginning of transmission data. If distortion occurs in the preamble due to the performance of the amplifier or the characteristics of the transmission channel, for example, the receiving end may become unable to correctly restore the subsequent data. Among amplifiers used on the transmitting end, amplifiers with a lower peak-to-average power ratio (PAPR) produce signals with less distortion. Since the PAPR rises if the sequence length of the preamble becomes longer, technology for generating a preamble with a low PAPR is being developed.

Unexamined Japanese Patent Application Publication (Translation of PCT Application) No. 2008-508803 discloses technology that generates a preamble based on a constant amplitude zero auto-correlation (CAZAC) sequence.

The preamble generated by the technology disclosed in Unexamined Japanese Patent Application Publication (Translation of PCT Application) No. 2008-508803 has a power of 2 length, and the preamble length cannot be set to an arbitrary length. The types of preambles that may be generated are also limited.

SUMMARY

The present invention, being devised in light of circumstances like the above, takes as an objective to reduce the PAPR of a preamble of arbitrary length.

In order to achieve the above object, a preamble generating device according to a first aspect of the present invention is a preamble generating device that generates a preamble constituting a preamble sequence positioned at a beginning of a transmit signal, comprising:

a model determiner that determines on a preamble model, the preamble model being an arrangement of 0 and 1 data according to a predetermined criterion;

a first calculator that reorders elements in at least one of either a real data sequence that is a real part of a data sequence, the data sequence being an arrangement of data of a same number as a number of elements in the preamble model, or an imaginary data sequence that is an imaginary part of the data sequence, and generates first computational data by multiplying each element in a result obtained by applying a fast Fourier transform to data that takes as a real part and an imaginary part thereof at least one of the real data sequence and the imaginary data sequence with reordered elements by an element of the preamble model at a same position as the each element;

a second calculator that generates second computational data by applying an inverse fast Fourier transform to the first computational data, and performing computation that converts an absolute value of each element in the inverse fast Fourier-transformed first computational data into a value in a predetermined range;

a third calculator that generates third computational data by applying a fast Fourier transform to the second computational data, and multiplying each element in the fast Fourier-transformed second computational data by an element of the preamble model at a same position as the each element; and a decider that applies an inverse fast Fourier transform to the third computational data, computes a peak-to-average power ratio of the inverse fast Fourier-transformed third computational data, and in a case of the peak-to-average power ratio matching a predetermined criterion, generates the third computational data as the preamble.

Preferably, the first calculator cyclically shifts each element of at least one of either the real data sequence or the imaginary data sequence a predetermined number of times in a predetermined direction, and generates the first computational data by multiplying each element in a result obtained by applying a fast Fourier transform to data that takes as the real part and the imaginary part thereof at least one of the real data sequence and the imaginary data sequence with cyclically shifted elements by an element of the preamble model at a same position as the each element.

Preferably, the preamble generating device further comprises a process repeater that, in a case of the decider deciding that the peak-to-average power ratio does not match the predetermined criterion, changes an order of elements in at least one of either the real data sequence or the imaginary data sequence when generating the first computational data, and repeats processing of the first calculator, the second calculator, and the third calculator;

wherein the decider applies an inverse fast Fourier transform to the third computational data generated by the repeated processing of the process repeater, and in a case in which the peak-to-average power ratio of the inverse fast Fourier-transformed third computational data matches the predetermined criterion, generates the third computational data as the preamble.

Preferably, the second calculator generates the second computational data by performing computation that, from among elements of the inverse fast Fourier-transformed first computational data, converts absolute values of elements whose absolute values are greater than a first threshold value into the first threshold value, and by performing computation that converts absolute values of elements whose absolute values are less than a second threshold value into the second threshold value, and the first threshold value is greater than the second threshold value.

Preferably, the decider computes the peak-to-average power ratio and an autocorrelation of the inverse fast Fourier-transformed third computational data, and in a case of the peak-to-average power ratio and the autocorrelation matching predetermined criteria, generates the third computational data as the preamble.

Preferably, the preamble generating device further comprises a second process repeater that repeats processing of the second calculator and the third calculator using the third computational data instead of the first computational data, according to a predetermined criterion.

Preferably, the second process repeater changes the predetermined range used in computation by the second calculator, and repeats the processing of the second calculator and the third calculator, and the decider applies an inverse fast Fourier transform to the third computational data generated by the repeated processing of the second process repeater, and in a case in which the peak-to-average power ratio of the inverse fast Fourier-transformed third computational data matches the predetermined criterion, generates the third computational data as the preamble.

Preferably, the preamble generating device further comprises a process repeater that, in a case of the decider deciding that the peak-to-average power ratio does not match the predetermined criterion, repeats processing of the first calculator, the second calculator, the third calculator, and the second process repeater;

wherein the second process repeater increases a number of times to repeat the processing of the second calculator and the third calculator every time the decider decides that the peak-to-average power ratio does not match the predetermined criterion.

A preamble generating method according to a second aspect of the present invention is a preamble generating method that generates a preamble constituting a preamble sequence positioned at a beginning of a transmit signal, comprising:

a model determining step that determines on a preamble model, the preamble model being an arrangement of 0 and 1 data according to a predetermined criterion;

a first calculating step that reorders elements in at least one of either a real data sequence that is a real part of a data sequence, the data sequence being an arrangement of data of a same number as a number of elements in the preamble model, or an imaginary data sequence that is an imaginary part of the data sequence, and generates first computational data by multiplying each element in a result obtained by applying a fast Fourier transform to data that takes as a real part and an imaginary part thereof at least one of the real data sequence and the imaginary data sequence with reordered elements by an element of the preamble model at a same position as the each element;

a second calculating step that generates second computational data by applying an inverse fast Fourier transform to the first computational data, and performing computation that converts an absolute value of each element in the inverse fast Fourier-transformed first computational data into a value in a predetermined range;

a third calculating step that generates third computational data by applying a fast Fourier transform to the second computational data, and multiplying each element in the fast Fourier-transformed second computational data by an element of the preamble model at a same position as the each element; and a deciding step that applies an inverse fast Fourier transform to the third computational data, computes a peak-to-average power ratio of the inverse fast Fourier-transformed third computational data, and in a case of the peak-to-average power ratio matching a predetermined criterion, generates the third computational data as the preamble.

A non-transitory computer-readable recording medium storing a program according to a third aspect of the present invention causes a computer that controls a preamble generating device that generates a preamble constituting a preamble sequence positioned at a beginning of a transmit signal to execute:

a model determining step that decides on a preamble model, the preamble model being an arrangement of 0 and 1 data according to a predetermined criterion;

a first calculating step that reorders elements in at least one of either a real data sequence that is a real part of a data sequence, the data sequence being an arrangement of data of a same number as a number of elements in the preamble model, or an imaginary data sequence that is an imaginary part of the data sequence, and generates first computational data by multiplying each element in a result obtained by applying a fast Fourier transform to data that takes as a real part and an imaginary part thereof at least one of the real data sequence and the imaginary data sequence with reordered elements by an element of the preamble model at a same position as the each element;

a second calculating step that generates second computational data by applying an inverse fast Fourier transform to the first computational data, and performing computation that converts an absolute value of each element in the inverse fast Fourier-transformed first computational data into a value in a predetermined range;

a third calculating step that generates third computational data by applying a fast Fourier transform to the second computational data, and multiplying each element in the fast Fourier-transformed second computational data by an element of the preamble model at a same position as the each element; and a deciding step that applies an inverse fast Fourier transform to the third computational data, computes a peak-to-average power ratio of the inverse fast Fourier-transformed third computational data, and in a case of the peak-to-average power ratio matching a predetermined criterion, generates the third computational data as the preamble.

According to the present invention, reducing the PAPR of a preamble of arbitrary length becomes possible.

BRIEF DESCRIPTION OF THE DRAWINGS

A more complete understanding of this application can be obtained when the following detailed description is considered in conjunction with the following drawings, in which.

DETAILED DESCRIPTION

Figure 1:
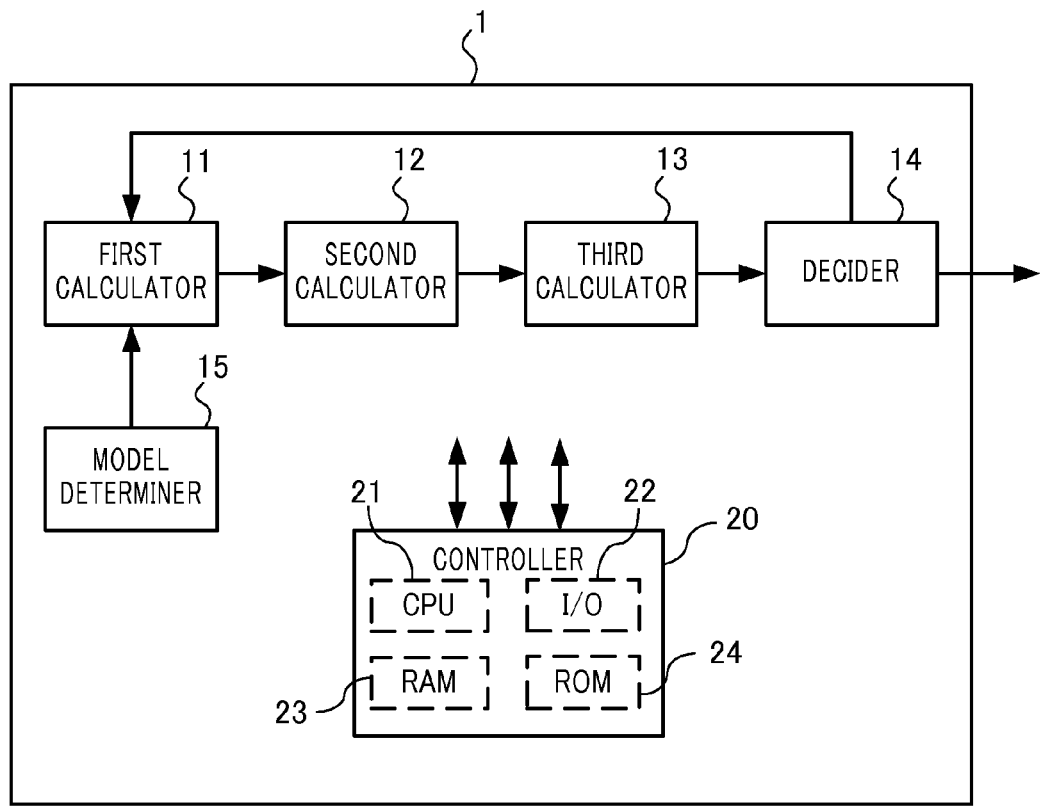
FIG. 1 is a block diagram illustrating an exemplary configuration of a preamble generating device according to an embodiment of the present invention.

Hereinafter, an exemplary embodiment of the present invention will be described in detail and with reference to the drawings. Note that in the drawings, the same signs are given to the same or similar parts. In the following description, the inverse fast Fourier transform (IFFT) is taken to be a concept that includes the IFFT and the inverse discrete Fourier transform (IDFT). Consequently, an embodiment of the present invention may also be configured to apply the IDFT instead of the IFFT. Similarly, the fast Fourier transform (FFT) is taken to be a concept that includes the FFT and the discrete Fourier transform (DFT). Also, in the case of applying the IDFT and the DFT, the FFT size in the following description means the DFT size.

FIG. 1 is a block diagram illustrating an exemplary configuration of a preamble generating device according to an embodiment of the present invention. The preamble generating device 1 is equipped with a first calculator 11, a second calculator 12, a third calculator 13, a decider 14, a model determiner 15, and a controller 20. The controller 20 is equipped with a central processing unit (CPU) 21, random access memory (RAM) 23, and read-only memory (ROM) 24. Signal lines from the controller 20 to each component are omitted to avoid complexity and ease comprehension, but the controller 20 is connected to each component of the preamble generating device 1 via input/output (I/O) 22, and controls the starting, ending, and content of processes conducted by each component. The ROM 24 stores a control program used by the controller 20 to control the operation of the preamble generating device 1. The controller 20 controls the preamble generating device 1 based on the control program.

Figure 2:
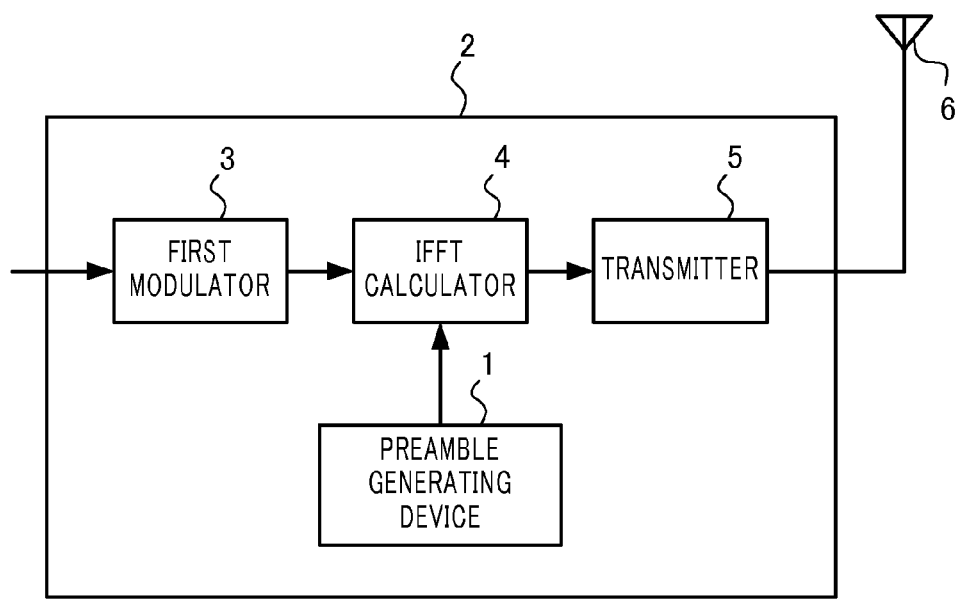
FIG. 2 is a block diagram illustrating an exemplary configuration of a communication device equipped with a preamble generating device according to an embodiment of the present invention.

FIG. 2 is a block diagram illustrating an exemplary configuration of a communication device equipped with a preamble generating device according to an embodiment. The communication device 2 is equipped with a preamble generating device 1, a primary modulator 3, an IFFT calculator 4, a transmitter 5, and an antenna 6. In the example in FIG. 2, the communication device 2 communicates with another device by wireless communication in an orthogonal frequency-division multiplexing (OFDM) scheme, under control by components such as a CPU, RAM, and ROM (not illustrated). The primary modulator 3 generates a primary-modulated signal by primary-modulating an input signal using a modulation scheme such as quadrature phase-shift keying (QPSK), for example. The IFFT calculator 4 calculates the IFFT of primary-modulated signal and the preamble output by the preamble generating device 1, and sends the IFFT calculation result to the transmitter 5. The transmitter 5 generates a preamble sequence from the IFFT-transformed preamble, and generates transmission data including the preamble at the beginning from a baseband signal based on the preamble sequence and the IFFT-transformed primary-modulated signal. Subsequently, the transmitter 5 transmits the generated transmission data to another device at the other end of the communication. The preamble sequence is used for purposes such as signal detection, correction, and synchronization, and is determined according to the application and the specifications of the communication scheme. The preamble sequence may be constructed by combining a plurality of preambles generated by the preamble generating device 1.

Figure 3:
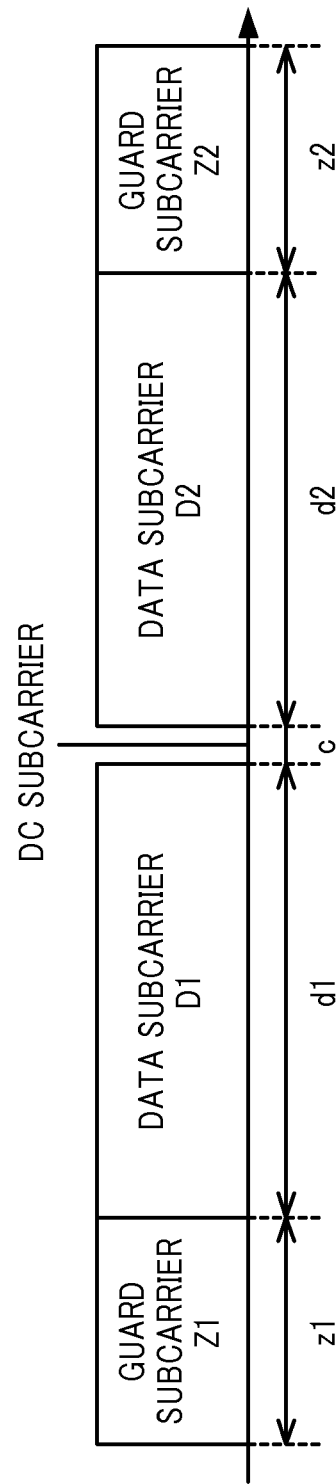
FIG. 3 is a diagram illustrating an example of a preamble model according to an embodiment.

Each component of the preamble generating device 1 will be described. The model determiner 15 determines on a preamble model, which is an arrangement of 0 and 1 data according to a predetermined criterion. The preamble model includes guard subcarriers which guard against interference produced by multipaths or the like and which are positioned at both ends, subcarriers not used for data communication which are positioned near the center, and data subcarriers based on predetermined patterns, which are placed between the subcarriers not used for data communication and the guard subcarriers. The sequence length of the preamble model may be arbitrarily determined FIG. 3 is a diagram illustrating an example of a preamble model according to an embodiment. The preamble model includes guard subcarriers Z1 and Z2 whose respective elements have values of 0, a DC subcarrier not used for data communication whose elements have values of 0, and data subcarriers D1 and D2 based on predetermined patterns placed between the guard subcarriers and the DC subcarrier. For example, in the case of setting the sequence length N of the preamble model to 2048, it is possible to set the sequence length z1 of the guard subcarrier Z1 to 184, the sequence length d1 of the data subcarrier D1 to 840, the sequence length c of the DC subcarrier to 1, the sequence length d2 of the data subcarrier D2 to 840, and the sequence length z2 of the guard subcarrier Z2 to 183. The relationship $N=z1+d1+c+d2+z2$ holds true.

Figure 4:
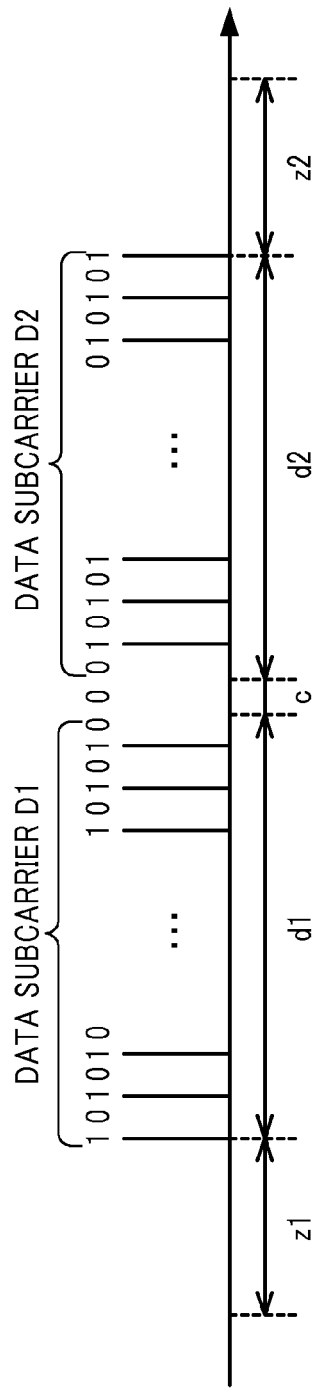
FIG. 4 is a diagram illustrating an example of a long preamble model according to an embodiment.
Figure 5:
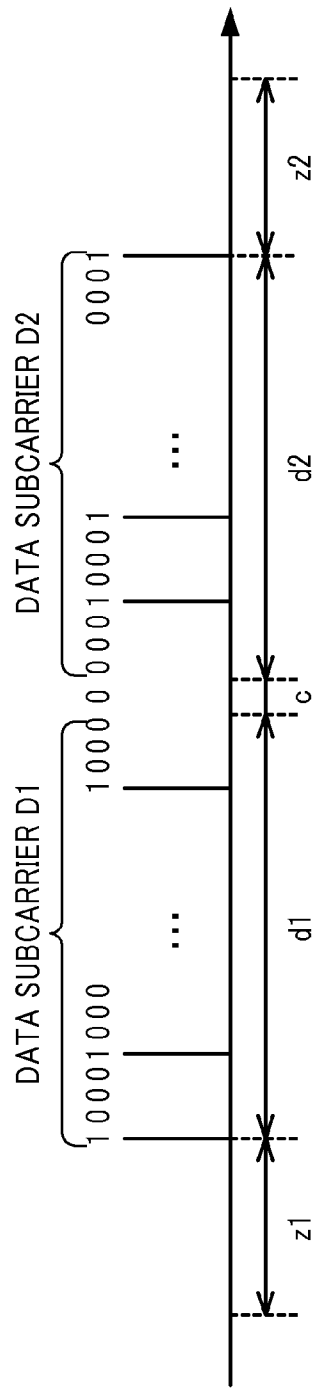
FIG. 5 is a diagram illustrating an example of a short preamble model according to an embodiment.

FIG. 4 is a diagram illustrating an example of a long preamble model according to an embodiment. In the long preamble model, the data subcarrier D1 is a data sequence of alternately repeating 1s and 0s, while the data subcarrier D2 is a data sequence of alternately repeating 0s and 1s. FIG. 5 is a diagram illustrating an example of a short preamble model according to an embodiment. In the short preamble model, the data subcarrier D1 is a data sequence of repeating data made up of 1, 0, 0, 0, while the data subcarrier D2 is a data sequence of repeating data made up of 0, 0, 0, 1. In the preamble generating device 1 according to the embodiment, the model determiner 15 sends either the long preamble model or the short preamble model to the first calculator 11 as the preamble model.

The model determiner 15 may also determine on a preamble model based on external input. The preamble output by the model determiner 15 may be stored by the RAM 23, and the first calculator 11 may acquire a preamble model stored in the RAM 23.

The first calculator 11 reorders elements in at least one of either a real data sequence, which is a real part of the data sequence, the data sequence being an arbitrary arrangement of data of a same number as a number of elements in the preamble model, or an imaginary data sequence, which is an imaginary part of the data sequence. Subsequently, the first calculator 11 generates first computational data by multiplying each element in the result obtained by applying the FFT to data that takes as a real part and an imaginary part thereof at least one of the real data sequence and the imaginary data sequence with reordered elements by an element of the preamble model at a same position as the each element. Note that the FFT size is N. The first calculator 11 sends the first computational data to the second calculator 12.

Figure 6:
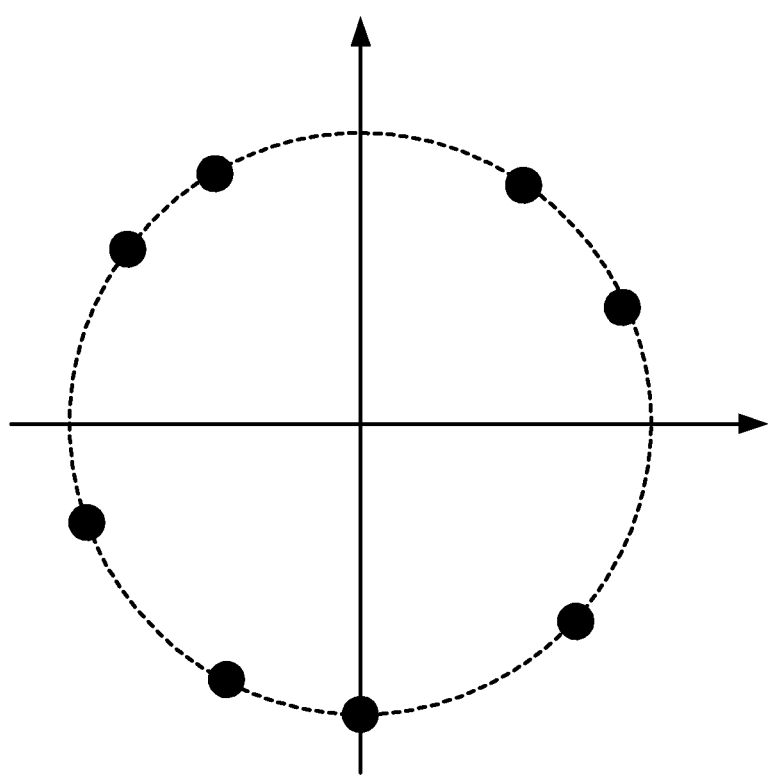
FIG. 6 is a diagram illustrating a data sequence according to an embodiment in the complex plane.

For the data sequence, data such as random data, a constant amplitude zero auto-correlation (CAZAC) sequence, or a pseudorandom noise (PN) sequence may be used, for example. FIG. 6 is a diagram illustrating a data sequence according to an embodiment in the complex plane. In FIG. 6, the black circles represent respective elements of a data sequence. Although the data sequence is an arbitrary arrangement of data, in order to realize a preamble with a low peak-to-average power ratio (PAPR), the respective elements of the data sequence are preferably positioned on the circumference of a circle centered on the origin in the complex plane as illustrated in FIG. 6. In other words, the absolute values of the respective elements are preferably equal. For such a sequence whose respective elements have equal absolute values, the PAPR of the sequence becomes 0 dB according to the definition of the PAPR. Consequently, such a sequence is ideal as a data sequence for generating a preamble with a low PAPR. Also, as an example of a process that reorders the elements in at least one of either the real data sequence or the imaginary data sequence in such a data sequence, the following will describe a case in which the first calculator 11 cyclically shifts each element in at least one of either the real data sequence or the imaginary data sequence a predetermined number of times in a predetermined direction.

Let A_seq represent the data sequence as a column vector with N elements, let Re(A_seq) represent the real data sequence, and let Im(A_seq) represent the imaginary data sequence. For example, the first calculator 11 cyclically shifts the imaginary data sequence Im(A_seq) k times in a predetermined direction, such as in the upward direction when the elements of the imaginary data sequence Im(A_seq) are arranged from top to bottom, for example. Let Circ(Im(A_seq), k) represent an imaginary data sequence that has been cyclically shifted in the upward direction k times. The data $A\_seq^{(k)}$ that takes as the real part and the imaginary part thereof the real data sequence Re(A_seq) and the imaginary data sequence Circ(Im(A_seq), k) that has been cyclically shifted k times is expressed in the following equation (1). In the following equation (1), j represents the imaginary unit.

[Eq. 1]

$$A\_seq^{(k)} = Re(A\_seq) + j \cdot Circ(Im(A\_seq), k) \quad (1)$$

The result B_seq of applying the FFT to $A\_seq^{(k)}$ is expressed in the following equation (2). Taking the preamble model to be PA_seq, the first computational data C_seq is expressed in the following equation (3). In the following equation (2), F represents an FFT matrix with an FFT size of N. In the following equation (3), the black circle represents the Hadamard product.

[Eq. 2]

$$B\_seq = F \cdot A\_seq^{(k)} \quad (2)$$

[Eq. 3]

$$C\_seq = B\_seq \cdot PA\_seq \quad (3)$$

The second calculator 12 generates second computational data by applying the IFFT to the first computational data, and performing computation that converts an absolute value of each element in the IFFT-transformed first computational data into a value in a predetermined range. For example, the second calculator 12 generates second computational data by performing computation that, from among elements of the IFFT-transformed first computational data, converts absolute values of elements whose absolute values are greater than a first threshold value into the first threshold value, and by performing computation that converts absolute values of elements whose absolute values are less than a second threshold value into the second threshold value. The second calculator 12 sends the second computational data to the third calculator 13.

The first threshold value and the second threshold value may be arbitrarily determined within a range that satisfies the condition of the first threshold value being greater than the second threshold value. In addition, the first threshold value and the second threshold value may be constants, but may also be data that is subjected to computation, or in other words, variables that are decided based on the maximum value and the minimum value of the absolute values of the IFFT-transformed first computational data. For example, the first threshold value a is determined as the value obtained by multiplying a value c by the maximum value of the absolute values of the elements in the IFFT-transformed first computational data, while the second threshold value b is determined as the value obtained by multiplying a value d by the minimum value of the absolute values in the IFFT-transformed first computational data. However, the value c satisfies $0 < c \leq 1$, the value d satisfies $d \geq 1$, and at least one of the value c and the value d is not equal to 1.

The IFFT-transformed first computational data D_seq is expressed like in the following equation (4). In the following equation (4), $F^{-1}$ represents an IFFT matrix with an FFT size of N.

[Eq. 4]

$$D\_seq = F^{-1} \cdot C\_seq \quad (4)$$

Figure 7:
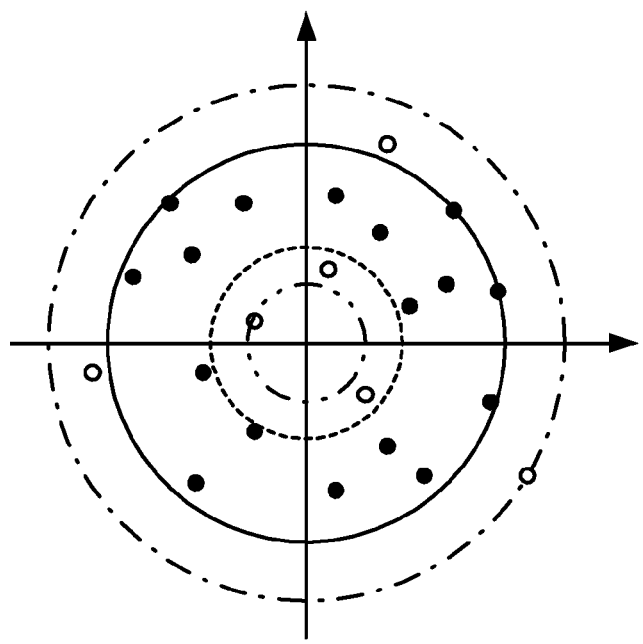
FIG. 7 is a diagram illustrating an example of IFFT-transformed first computational data according to an embodiment.
Figure 8:
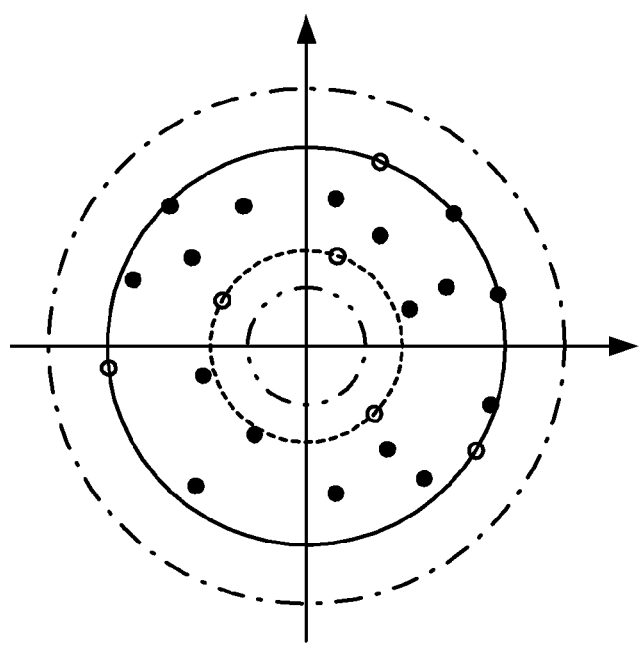
FIG. 8 is a diagram illustrating an example of second computational data according to an embodiment.

FIG. 7 is a diagram illustrating an example of IFFT-transformed first computational data according to an embodiment. FIG. 7 is a diagram in which each element of the IFFT-transformed first computational data D_seq is expressed in the complex plane. The maximum value of the absolute values of the IFFT-transformed first computational data D_seq is indicated by the one-dot chain line, while the minimum value of the absolute values is indicated by the two-dot chain line. Also, the first threshold value a is indicated by the solid line, while the second threshold value b is indicated by the dotted line. Among the elements in the IFFT-transformed first computational data D_seq, elements whose absolute values are greater than the first threshold value a and elements whose absolute values are less than the second threshold value b are indicated by white circles, while other elements are indicated by black circles. FIG. 8 is a diagram illustrating an example of second computational data according to an embodiment. FIG. 8 demonstrates how, by performing the computation discussed earlier in the second calculator 12, the absolute values of the elements indicated by the white circles in FIG. 7 become equal to the first threshold value a or the second threshold value b in FIG. 8.

The absolute values of the respective elements in the second computational data obtained by the above computation converge within a range that is less than or equal to the first threshold value a, and equal to or greater than the second threshold value b. For this reason, reducing the PAPR becomes possible.

The third calculator 13 generates third computational data by applying the FFT to the second computational data, and multiplying each element in the FFT-transformed second computational data by an element of the preamble model at a same position as the each element. The third calculator 13 sends the third computational data to the decider 14.

Taking the second computational data to be E_seq, the FFT-transformed second computational data F_seq is expressed by the following equation (5), and the third computational data G_seq is expressed by the following equation (6).

[Eq. 5]

$$F\_seq = F \cdot E\_seq \quad (5)$$

[Eq. 6]

$$G\_seq = F\_seq \cdot PA\_seq \quad (6)$$

The decider 14 applies the IFFT to the third computational data, and computes the PAPR of the IFFT-transformed third computational data. In the case in which the PAPR matches a predetermined criterion, the decider 14 generates and outputs the third computational data as a preamble. For example, the decider 14 decides that the PAPR matches the predetermined criterion in the case in which the PAPR is less than or equal to a threshold value. The threshold value may be arbitrarily determined according to factors such as the amplifier performance on the transmitting end or the transmission channel. In the case in which the PAPR does not match the predetermined criterion, the decider 14 gives notice of this result to the first calculator 11. Upon receiving the notice, the first calculator 11 changes an order of elements by changing a number of times to cyclically shift at least one of either the real data sequence or the imaginary data sequence, and conducts the processing discussed earlier to generate new first computational data. The second calculator 12, the third calculator 13, and the decider 14 conduct the processing discussed earlier based on the new first computational data. The controller 20 functions as a process repeater that changes the cyclic shift count and repeats the processing of the first calculator 11, the second calculator 12, and the third calculator 13.

The decider 14 may also compute the PAPR and the autocorrelation of the IFFT-transformed third computational data, and generate the third computational data as a preamble in the case in which the PAPR and the autocorrelation match predetermined criteria. For example, the decider 14 decides that the autocorrelation matches a predetermined criterion in the case in which the peak of correlation values in the IFFT-transformed third computational data is equal to or greater than a threshold value. The threshold value may be arbitrarily determined The IFFT-transformed third computational data H_seq is expressed in the following equation (7). In the first calculator 11, the initial value of the cyclic shift count k may be set to 0, and in the case in which the PAPR of the IFFT-transformed third computational data H_seq does not match the predetermined criterion, k may be incremented by 1, and the first calculator 11, the second calculator 12, the third calculator 13, and the decider 14 may be made to repeat the processing discussed earlier.

[Eq. 7]

$$H\_seq = F^{-1} \cdot G\_seq \quad (7)$$

Figure 9:
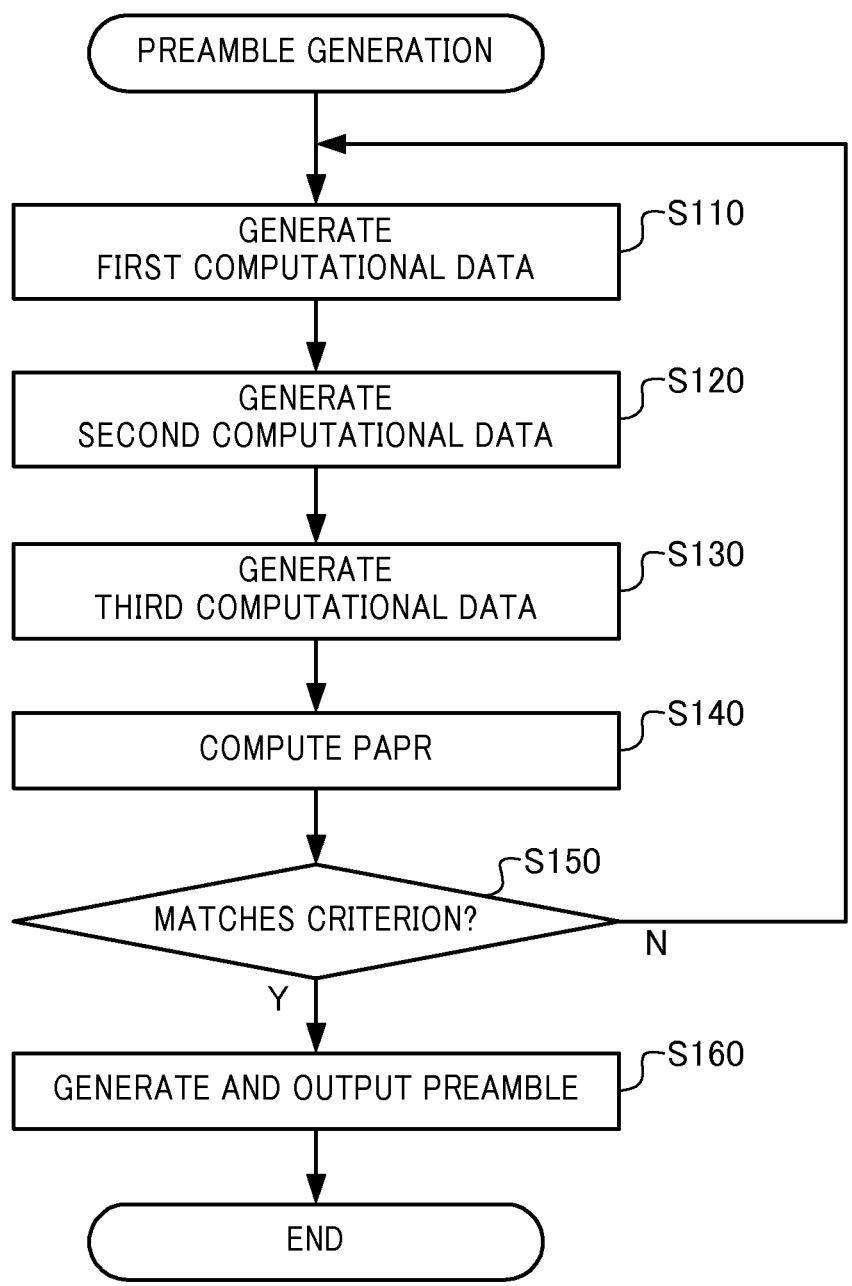
FIG. 9 is a flowchart illustrating an example of preamble generating operations conducted by a preamble generating device according to an embodiment.

FIG. 9 is a flowchart illustrating an example of preamble generating operations conducted by a preamble generating device according to an embodiment. The first calculator 11 cyclically shifts at least one of either a real data sequence, which is a real part of the data sequence, the data sequence being an arbitrary arrangement of data of a same number as a number of elements in the preamble model, or an imaginary data sequence, which is an imaginary part of the data sequence. The first calculator 11 conducts the cyclical shift a predetermined number of times and in a predetermined direction. Subsequently, the first calculator 11 generates first computational data by multiplying each element in the result obtained by applying the FFT to data that takes as a real part and an imaginary part thereof at least one of the real data sequence and the imaginary data sequence with cyclically shifted elements by an element of the preamble model at a same position as the each element (step S110).

The second calculator 12 generates second computational data by applying the IFFT to the first computational data, and performing computation that converts an absolute value of each element in the IFFT-transformed first computational data into a value in a predetermined range (step S120). The third calculator 13 generates third computational data by applying the FFT to the second computational data, and multiplying each element in the FFT-transformed second computational data by an element of the preamble model at a same position as the each element (step S130).

The decider 14 applies the IFFT to the third computational data, and computes the PAPR of the IFFT-transformed third computational data (step S140). In the case in which the PAPR matches a predetermined criterion (step S150; Y), the decider 14 generates and outputs the third computational data as a preamble (step S160). In the case in which the PAPR does not match the predetermined criterion (step S150; N), the preamble generation process returns to step S110, and the process repeater changes a number of times the first calculator 11 performs a cyclical shift, and repeats the above process. Note that the decider 14 may also compute the PAPR and the autocorrelation of the IFFT-transformed third computational data in step S140, and decide whether or not the PAPR and the autocorrelation match predetermined criteria in step S150.

Figure 10:
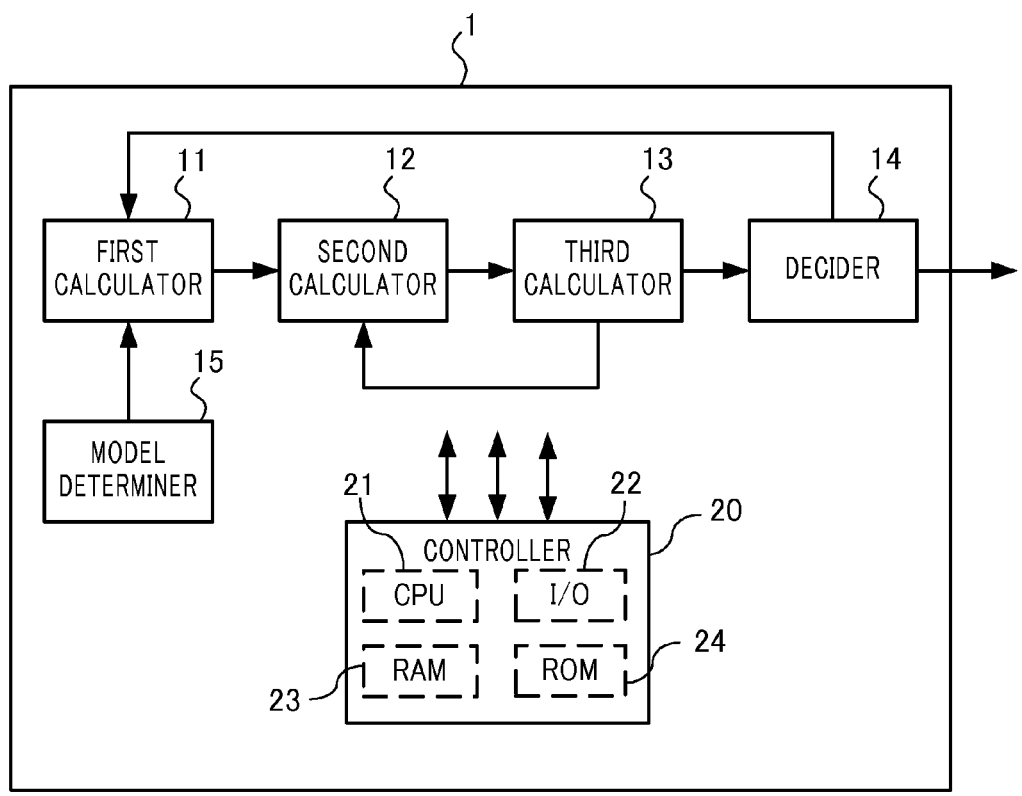
FIG. 10 is a block diagram illustrating a different exemplary configuration of a preamble generating device according to an embodiment of the present invention.

FIG. 10 is a block diagram illustrating a different exemplary configuration of a preamble generating device according to an embodiment of the present invention. In the preamble generating device 1 illustrated in FIG. 10, for a given data sequence, the first calculator 11, the second calculator 12, and the third calculator 13 conduct respective processing, and after that, the processing of the second calculator 12 and the processing of the third calculator 13 using the third computational data instead of the first computational data are repeated in accordance with a predetermined criterion. The controller 20 functions as a second process repeater that repeats the processing of the second calculator 12 and the processing of the third calculator 13. The above predetermined range used in the computation by the second calculator 12 is a variable range decided according to factors such as the maximum value and/or the minimum value of the absolute values and the degree of variation in the absolute values of data that is subjected to computation, or in other words, the IFFT-transformed first computational data or the third computational data. The controller 20 that functions as the second process repeater changes the above predetermined range used in the computation by the second calculator 12, and repeats the processing of the second calculator 12 and the processing of the third calculator 13.

For example, the first threshold value and the second threshold value used in the second calculator 12 are variables decided based on the maximum value and the minimum value of the absolute values of the data being computed. The data being computed is the first computational data or the third computational data. For example, the first threshold value a is taken to be the value obtained by multiplying a value c by the maximum value of the absolute values of the data being computed, while the second threshold value b is taken to be the value obtained by multiplying a value d by the minimum value of the absolute values of the data being computed.

However, the value c satisfies 0<c≤1, the value d satisfies d≥1, at least one of the value c and the value d is not equal to 1, and the first threshold value a and the second threshold value b satisfy a>b.

The initial value of the repeat count m is set to 0. The third calculator 13 generates third computational data similarly to the preamble generating device 1 illustrated in FIG. 1, and then increments m by 1. Subsequently, in the case in which m has not reached a threshold value, the third computational data is sent to the second calculator 12. The second calculator 12 applies the IFFT to the third computational data, and performs computation that converts the absolute value of each element in the IFFT-transformed third computational data into a value in a predetermined range. For example, the second calculator 12 generates second computational data by performing computation that, from among elements of the IFFT-transformed third computational data, converts absolute values of elements whose absolute values are greater than a first threshold value into the first threshold value, and by performing computation that converts absolute values of elements whose absolute values are less than a second threshold value into the second threshold value. The third calculator 13 repeats the above process until m reaches the threshold value, and sends the third computational data to the decider 14 when m reaches the threshold value.

Note that the threshold value for the repeat count m may be arbitrarily determined. In addition, the threshold value may be made variable, and by increasing the threshold value every time the PAPR and the autocorrelation are decided to not match the predetermined criteria by the decider 14, for example, the number of times that the processing of the second calculator 12 and the processing of the third calculator 13 are repeated may be increased. As a result, a preamble whose PAPR matches the criterion becomes easier to generate.

By repeating the processing of the second calculator 12 and the third calculator 13 by treating the first threshold value and the second threshold value as a variable decided based on the maximum value and the minimum value of data that is subjected to computation, the absolute values of elements in the second computational data further converge, and reducing the PAPR becomes possible.

Figure 11:
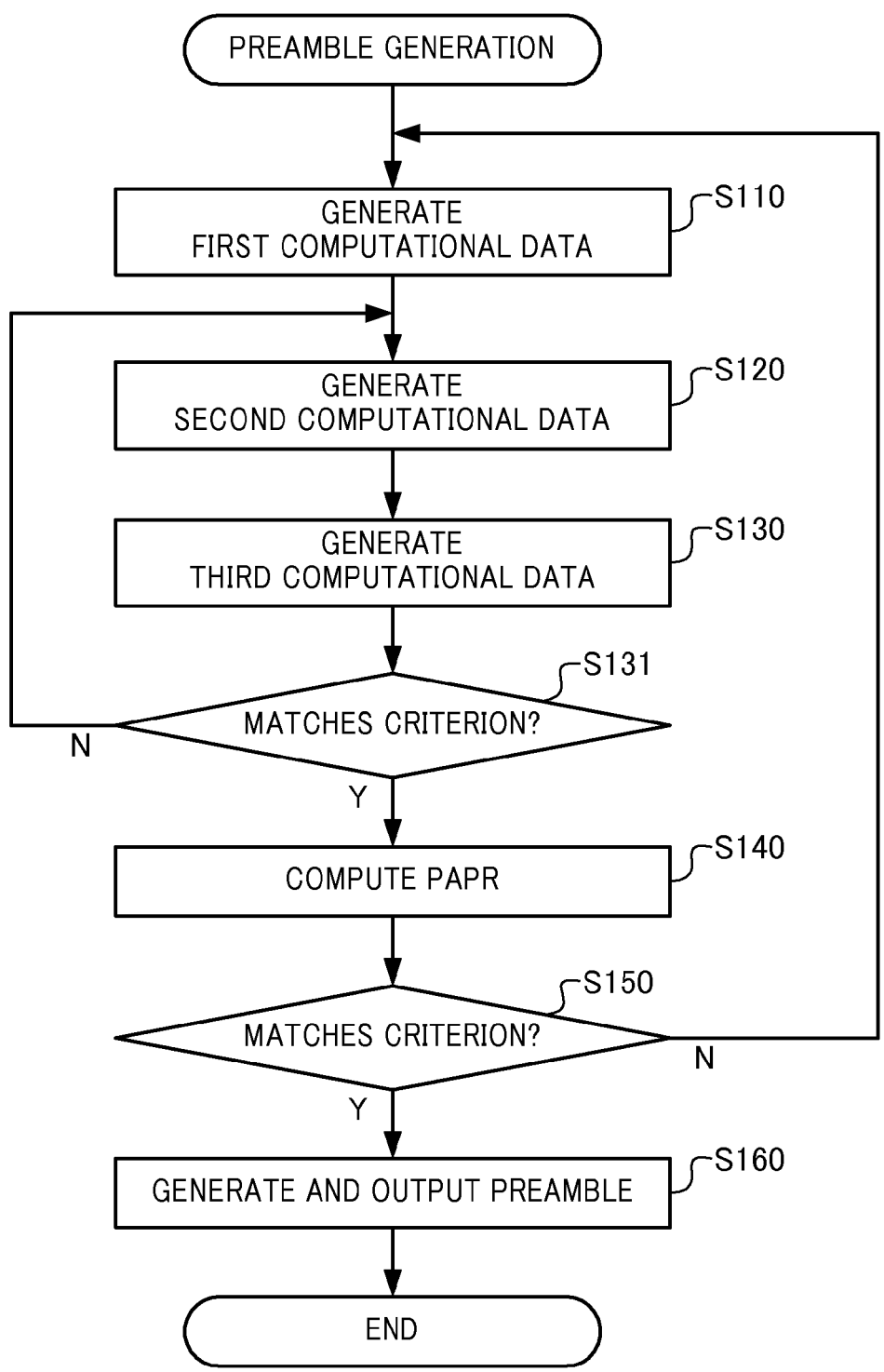
FIG. 11 is a flowchart illustrating a different example of preamble generating operations conducted by a preamble generating device according to an embodiment.

FIG. 11 is a flowchart illustrating a different example of preamble generating operations conducted by a preamble generating device according to an embodiment. The initial value of the repeat count m is set to 0. The processing of steps S110 to S130 in the case of m=0 is similar to FIG. 9. The third calculator 13 generates the third computational data, and then increments the repeat count m by 1. In the case in which the repeat count m has not reached the threshold value, it is determined that the repeat count m does not match the predetermined criterion (step S131; N), and the preamble generation process returns to step S120. The second calculator 12 generates new second computational data by applying the IFFT to the third computational data, and performing computation that converts the absolute value of each element in the IFFT-transformed third computational data into a value in a predetermined range (step S120). The processing in step S130 is similar to FIG. 9. The third calculator 13 executes the computation of step S130 discussed earlier on the new second computational data, and generates new third computational data (step S130). In the case in which the repeat count m has reached the threshold value as a result of repeating the above processing, the third calculator 13 determines that the repeat count m matches the predetermined criterion (step S131; Y), and the preamble generation process proceeds to step S140. The processing from steps S140 to S160 is similar to FIG. 9. The decider 14 applies the inverse fast Fourier transform to the third computational data obtained by repeating the processing of the second calculator 12 and the processing of the third calculator 13 m times, and computes the PAPR of the inverse fast Fourier-transformed third computational data (step S140). In the case in which the PAPR matches a predetermined criterion (step S150; Y), the third computational data is generated and output as a preamble (step S160). In the case in which the PAPR does not match the predetermined criterion (step S150; N), the preamble generation process returns to step S110. In other words, the process repeater changes the number of times a cyclic shift is conducted by the first calculator 11, and repeats the processing of the first calculator 11, the second calculator 12, the third calculator 13, and the second process repeater that repeats the processing of the second calculator 12 and the third calculator 13.

As described above, according to the preamble generating device 1 in accordance with an embodiment, reducing the PAPR of a preamble of arbitrary length becomes possible. In addition, as discussed above, generating a preamble having autocorrelation and resistant to the effects of distortion on the channel becomes possible. Since a preamble is generated based on a data sequence of arbitrary length, generating various preambles becomes possible. In addition, by varying the first threshold value a and the second threshold value b, generating various preambles becomes possible.

Specific Examples

Figure 12:
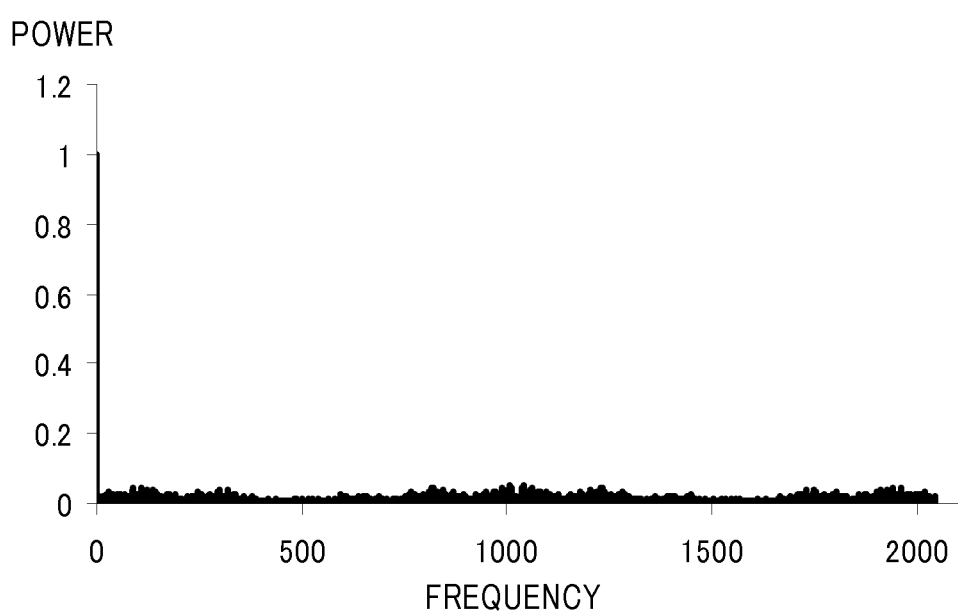
FIG. 12 is a diagram illustrating an example of preamble autocorrelation according to an embodiment.

For the preamble generating device 1 illustrated in FIG. 1, a simulation of generating a preamble was conducted by using the long preamble model as the preamble model, using a data sequence in which the real data sequence and the imaginary data sequence are respective PN sequences, taking the first threshold value a to be 10, and taking the second threshold value b to be 0.4. FIG. 12 is a diagram illustrating an example of preamble autocorrelation according to an embodiment. In FIG. 12, the horizontal axis is frequency (units: subcarrier interval f0), and the vertical axis is power expressing correlation values. A peak in the correlation values is produced, demonstrating that the preamble has autocorrelation. The PAPR of this preamble is 2.7 dB, demonstrating that the PAPR is comparatively low.

Figure 13:
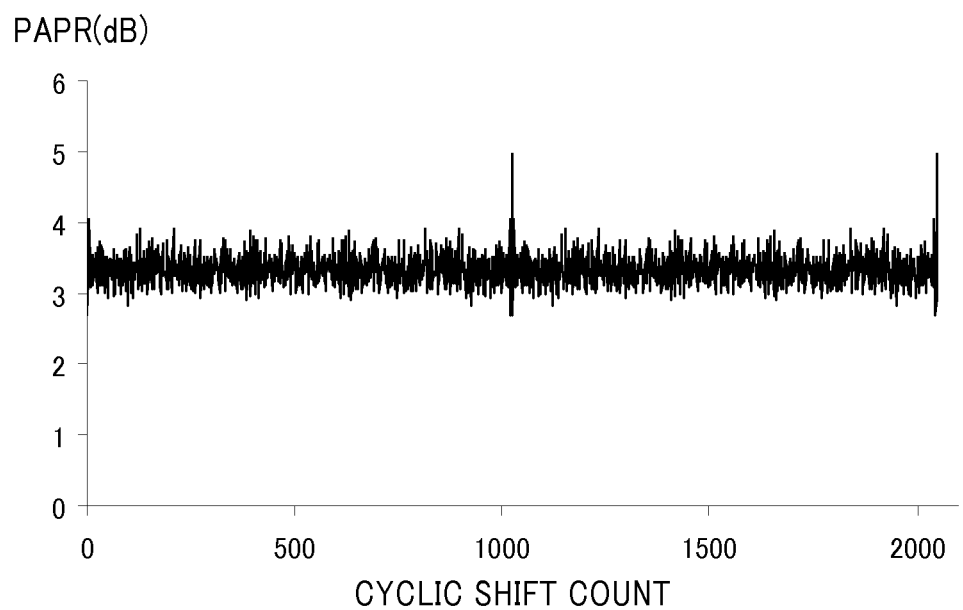
FIG. 13 is a diagram illustrating an example of the relationship between the cyclic shift count and the PAPR of a preamble according to an embodiment.

FIG. 13 is a diagram illustrating an example of the relationship between the cyclic shift count and the PAPR of a preamble according to an embodiment. FIG. 13 illustrates the relationship between the cyclic shift count and the PAPR of a preamble in the case of using the long preamble model. In FIG. 13, the horizontal axis is the cyclic shift count k in the first calculator 11, and the vertical axis is the PAPR (units: dB). The PAPR varies according to the cyclic shift count, thus demonstrating that reducing the PAPR is possible by changing the cyclic shift count and repeating the processing as discussed earlier.

Figure 14:
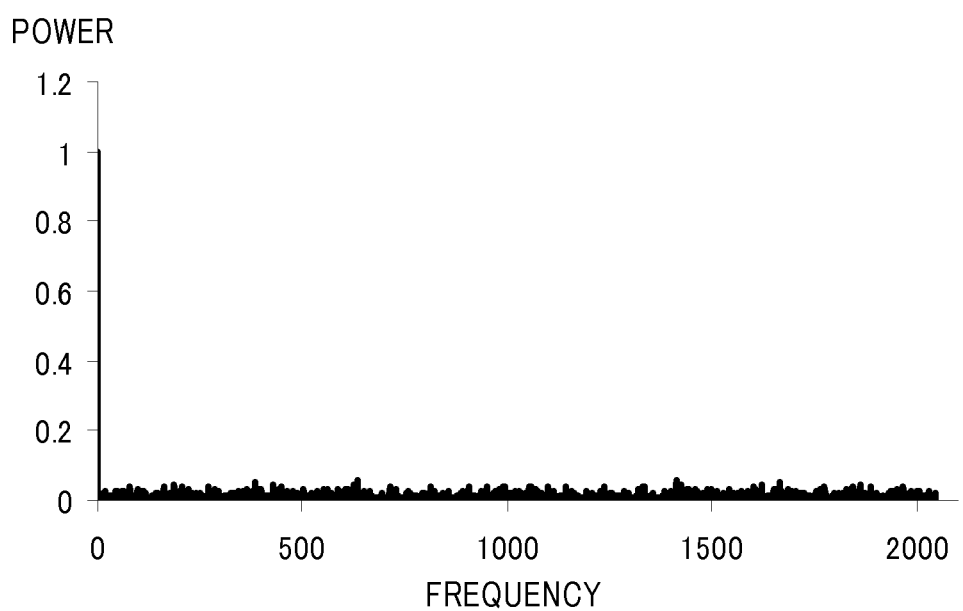
FIG. 14 is a diagram illustrating a different example of preamble autocorrelation according to an embodiment.

For the preamble generating device 1 illustrated in FIG. 1, a simulation of generating a preamble was conducted by using the short preamble model as the preamble model, and setting other conditions to the same as the simulation discussed above. FIG. 14 is a diagram illustrating a different example of preamble autocorrelation according to an embodiment. The layout of the diagram is similar to FIG. 12. Similarly to FIG. 12, a peak in the correlation values is produced, demonstrating that the preamble has autocorrelation. The PAPR of this preamble is 3.5 dB, demonstrating that the PAPR is comparatively low.

Figure 15:
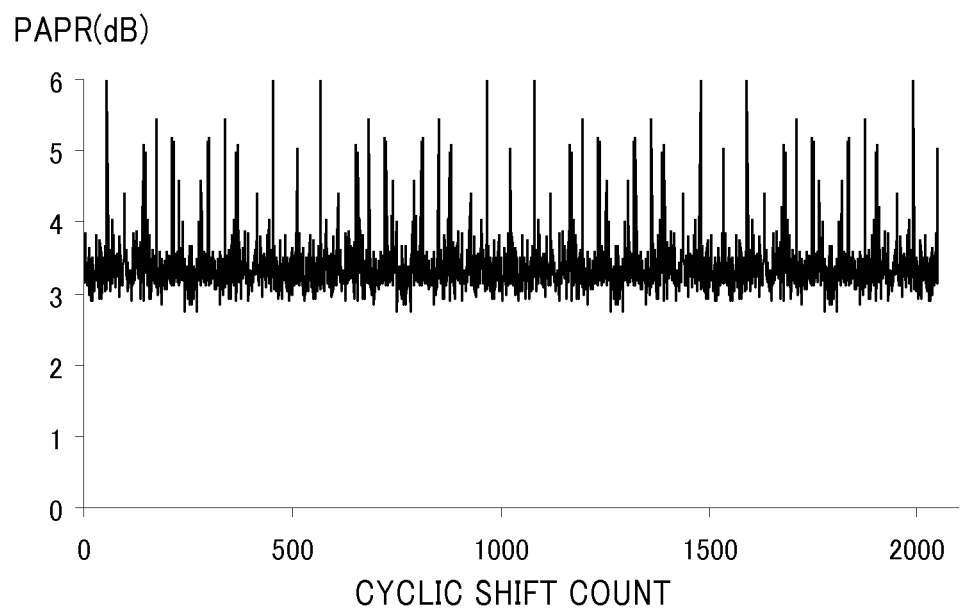
FIG. 15 is a diagram illustrating a different example of the relationship between the cyclic shift count and the PAPR of a preamble according to an embodiment.

FIG. 15 is a diagram illustrating a different example of the relationship between the cyclic shift count and the PAPR of a preamble according to an embodiment. FIG. 15 illustrates the relationship between the cyclic shift count and the PAPR of a preamble in the case of using the short preamble model. The layout of the diagram is similar to FIG. 13. Similarly to FIG. 13, the PAPR varies according to the cyclic shift count, thus demonstrating that reducing the PAPR is possible by changing the cyclic shift count and repeating the processing as discussed earlier.

The above simulations demonstrate that, according to an embodiment of the present invention, performing the computations discussed earlier makes it possible to generate a preamble having a low PAPR and autocorrelation.

An embodiment of the present invention is not limited to the foregoing embodiment. Each component of the preamble generating device 1 may also be configured to apply the IDFT instead of the IFFT, and configured to apply the DFT instead of the FFT.

The foregoing embodiment describes a case in which the first calculator 11 conducts a cyclical shift in the upward direction when elements in the imaginary data sequence from a data sequence are arranged from top to bottom as a process that changes the ordering of elements in a data sequence. However, the present invention may also be configured to cyclically shift elements in the real data sequence. In addition, the direction of the cyclic shift may be the reverse direction of the foregoing embodiment (downward direction). Furthermore, the configuration is not limited to a cyclic shift, and elements in at least one of the real data sequence and the imaginary data sequence may be reordered according to a predetermined rule, or randomly reordered.

The preamble generating device 1 in the present invention is not limited to executing a process of deciding whether or not the PAPR matches a predetermined criteria every time the third computational data is generated. For example, in the case in which the first calculator 11 generates the first computational data by cyclically shifting the data sequence, multiple pieces of third computational data may be generated by repeating the processing of the first calculator 11, the second calculator 12, and the third calculator 13 until the cyclic shift completes a full cycle. After that, the decider 14 may decide the data with the minimum PAPR of the IFFT-transformed data from among the generated multiple pieces of third computational data to match the predetermined criterion, and decide on such data as a preamble.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A preamble generating device that generates a preamble constituting a preamble sequence positioned at a beginning of a transmit signal, comprising:
   a model determiner that determines on a preamble model, the preamble model being an arrangement of 0 and 1 data according to a predetermined criterion;
   a first calculator that reorders elements in at least one of either a real data sequence that is a real part of a data sequence, the data sequence being an arrangement of data of a same number as a number of elements in the preamble model, or an imaginary data sequence that is an imaginary part of the data sequence, and generates first computational data by multiplying each element in a result obtained by applying a fast Fourier transform to data that takes as a real part and an imaginary part thereof at least one of the real data sequence and the imaginary data sequence with reordered elements by an element of the preamble model at a same position as the each element;
   a second calculator that generates second computational data by applying an inverse fast Fourier transform to the first computational data, and performing computation that converts an absolute value of each element in the inverse fast Fourier-transformed first computational data into a value in a predetermined range;
   a third calculator that generates third computational data by applying a fast Fourier transform to the second computational data, and multiplying each element in the fast Fourier-transformed second computational data by an element of the preamble model at a same position as the each element; and
   a decider that applies an inverse fast Fourier transform to the third computational data, computes a peak-to-average power ratio of the inverse fast Fourier-transformed third computational data, and in a case of the peak-to-average power ratio matching a predetermined criterion, generates the third computational data as the preamble.

2. The preamble generating device according to claim 1, wherein
   the first calculator cyclically shifts each element of at least one of either the real data sequence or the imaginary data sequence a predetermined number of times in a predetermined direction, and generates the first computational data by multiplying each element in a result obtained by applying a fast Fourier transform to data that takes as the real part and the imaginary part thereof at least one of the real data sequence and the imaginary data sequence with cyclically shifted elements by an element of the preamble model at a same position as the each element.

3. The preamble generating device according to claim 1, further comprising:
   a process repeater that, in a case of the decider deciding that the peak-to-average power ratio does not match the predetermined criterion, changes an order of elements in at least one of either the real data sequence or the imaginary data sequence when generating the first computational data, and repeats processing of the first calculator, the second calculator, and the third calculator;
   wherein the decider applies an inverse fast Fourier transform to the third computational data generated by the repeated processing of the process repeater, and in a case in which the peak-to-average power ratio of the inverse fast Fourier-transformed third computational data matches the predetermined criterion, generates the third computational data as the preamble.

4. The preamble generating device according to claim 1, wherein
   the second calculator generates the second computational data by performing computation that, from among elements of the inverse fast Fourier-transformed first computational data, converts absolute values of elements whose absolute values are greater than a first threshold value into the first threshold value, and by performing computation that converts absolute values of elements whose absolute values are less than a second threshold value into the second threshold value, and
   the first threshold value is greater than the second threshold value.

5. The preamble generating device according to claim 1, wherein
   the decider computes the peak-to-average power ratio and an autocorrelation of the inverse fast Fourier-transformed third computational data, and in a case of the peak-to-average power ratio and the autocorrelation matching predetermined criteria, generates the third computational data as the preamble.

6. The preamble generating device according to claim 1, further comprising:
a second process repeater that repeats processing of the second calculator and the third calculator using the third computational data instead of the first computational data, according to a predetermined criterion.

7. The preamble generating device according to claim 6, wherein
the second process repeater changes the predetermined range used in computation by the second calculator, and repeats the processing of the second calculator and the third calculator, and
the decider applies an inverse fast Fourier transform to the third computational data generated by the repeated processing of the second process repeater, and in a case in which the peak-to-average power ratio of the inverse fast Fourier-transformed third computational data matches the predetermined criterion, generates the third computational data as the preamble.

8. The preamble generating device according to claim 7, further comprising:
a process repeater that, in a case of the decider deciding that the peak-to-average power ratio does not match the predetermined criterion, repeats processing of the first calculator, the second calculator, the third calculator, and the second process repeater;
wherein the second process repeater increases a number of times to repeat the processing of the second calculator and the third calculator every time the decider decides that the peak-to-average power ratio does not match the predetermined criterion.

9. A preamble generating method that generates a preamble constituting a preamble sequence positioned at a beginning of a transmit signal, comprising:
a model determining step that determines on a preamble model, the preamble model being an arrangement of 0 and 1 data according to a predetermined criterion;
a first calculating step that reorders elements in at least one of either a real data sequence that is a real part of a data sequence, the data sequence being an arrangement of data of a same number as a number of elements in the preamble model, or an imaginary data sequence that is an imaginary part of the data sequence, and generates first computational data by multiplying each element in a result obtained by applying a fast Fourier transform to data that takes as a real part and an imaginary part thereof at least one of the real data sequence and the imaginary data sequence with reordered elements by an element of the preamble model at a same position as the each element;
a second calculating step that generates second computational data by applying an inverse fast Fourier transform to the first computational data, and performing computation that converts an absolute value of each element in the inverse fast Fourier-transformed first computational data into a value in a predetermined range;
a third calculating step that generates third computational data by applying a fast Fourier transform to the second computational data, and multiplying each element in the fast Fourier-transformed second computational data by an element of the preamble model at a same position as the each element; and
a deciding step that applies an inverse fast Fourier transform to the third computational data, computes a peak-to-average power ratio of the inverse fast Fourier-transformed third computational data, and in a case of the peak-to-average power ratio matching a predetermined criterion, generates the third computational data as the preamble.

10. The preamble generating method according to claim 9, wherein
the first calculating step cyclically shifts each element of at least one of either the real data sequence or the imaginary data sequence a predetermined number of times in a predetermined direction, and generates the first computational data by multiplying each element in a result obtained by applying a fast Fourier transform to data that takes as the real part and the imaginary part thereof at least one of the real data sequence and the imaginary data sequence with cyclically shifted elements by an element of the preamble model at a same position as the each element.

11. The preamble generating method according to claim 9, further comprising:
a repeating step that, in a case of the deciding step deciding that the peak-to-average power ratio does not match the predetermined criterion, changes an order of elements in at least one of either the real data sequence or the imaginary data sequence when generating the first computational data, and repeats processing of the first calculating step, the second calculating step, and the third calculating step;
wherein the deciding step applies an inverse fast Fourier transform to the third computational data generated by the repeated processing of the repeating step, and in a case in which the peak-to-average power ratio of the inverse fast Fourier-transformed third computational data matches the predetermined criterion, generates the third computational data as the preamble.

12. The preamble generating method according to claim 9, wherein
the second calculating step generates the second computational data by performing computation that, from among elements of the inverse fast Fourier-transformed first computational data, converts absolute values of elements whose absolute values are greater than a first threshold value into the first threshold value, and by performing computation that converts absolute values of elements whose absolute values are less than a second threshold value into the second threshold value, and
the first threshold value is greater than the second threshold value.

13. The preamble generating method according to claim 9, wherein
the deciding step computes the peak-to-average power ratio and an autocorrelation of the inverse fast Fourier-transformed third computational data, and in a case of the peak-to-average power ratio and the autocorrelation matching predetermined criteria, generates the third computational data as the preamble.

14. The preamble generating method according to claim 9, further comprising:
a second repeating step that repeats processing of the second calculating step and the third calculating step using the third computational data instead of the first computational data, according to a predetermined criterion.

15. The preamble generating method according to claim 14, wherein the second repeating step changes the predetermined range used in computation by the second calculating step, and repeats the processing of the second calculating step and the third calculating step, and the deciding step applies an inverse fast Fourier transform to the third computational data generated by the repeated processing of the second repeating step, and in a case in which the peak-to-average power ratio of the inverse fast Fourier-transformed third computational data matches the predetermined criterion, generates the third computational data as the preamble.

16. The preamble generating method according to claim 15, further comprising:

a repeating step that, in a case of the deciding step deciding that the peak-to-average power ratio does not match the predetermined criterion, repeats processing of the first calculating step, the second calculating step, the third calculating step, and the second repeating step;

wherein the second repeating step increases a number of times to repeat the processing of the second calculating step and the third calculating step every time the deciding step decides that the peak-to-average power ratio does not match the predetermined criterion.

17. A non-transitory computer-readable recording medium storing a program causing a computer that controls a preamble generating device that generates a preamble constituting a preamble sequence positioned at a beginning of a transmit signal to execute:

a model determining step that decides on a preamble model, the preamble model being an arrangement of 0 and 1 data according to a predetermined criterion;

a first calculating step that reorders elements in at least one of either a real data sequence that is a real part of a data sequence, the data sequence being an arrangement of data of a same number as a number of elements in the preamble model, or an imaginary data sequence that is an imaginary part of the data sequence, and generates first computational data by multiplying each element in a result obtained by applying a fast Fourier transform to data that takes as a real part and an imaginary part thereof at least one of the real data sequence and the imaginary data sequence with reordered elements by an element of the preamble model at a same position as the each element;

a second calculating step that generates second computational data by applying an inverse fast Fourier transform to the first computational data, and performing computation that converts an absolute value of each element in the inverse fast Fourier-transformed first computational data into a value in a predetermined range;

a third calculating step that generates third computational data by applying a fast Fourier transform to the second computational data, and multiplying each element in the fast Fourier-transformed second computational data by an element of the preamble model at a same position as the each element; and a deciding step that applies an inverse fast Fourier transform to the third computational data, computes a peak-to-average power ratio of the inverse fast Fourier-transformed third computational data, and in a case of the peak-to-average power ratio matching a predetermined criterion, generates the third computational data as the preamble.

* * * * *